Figure 1:
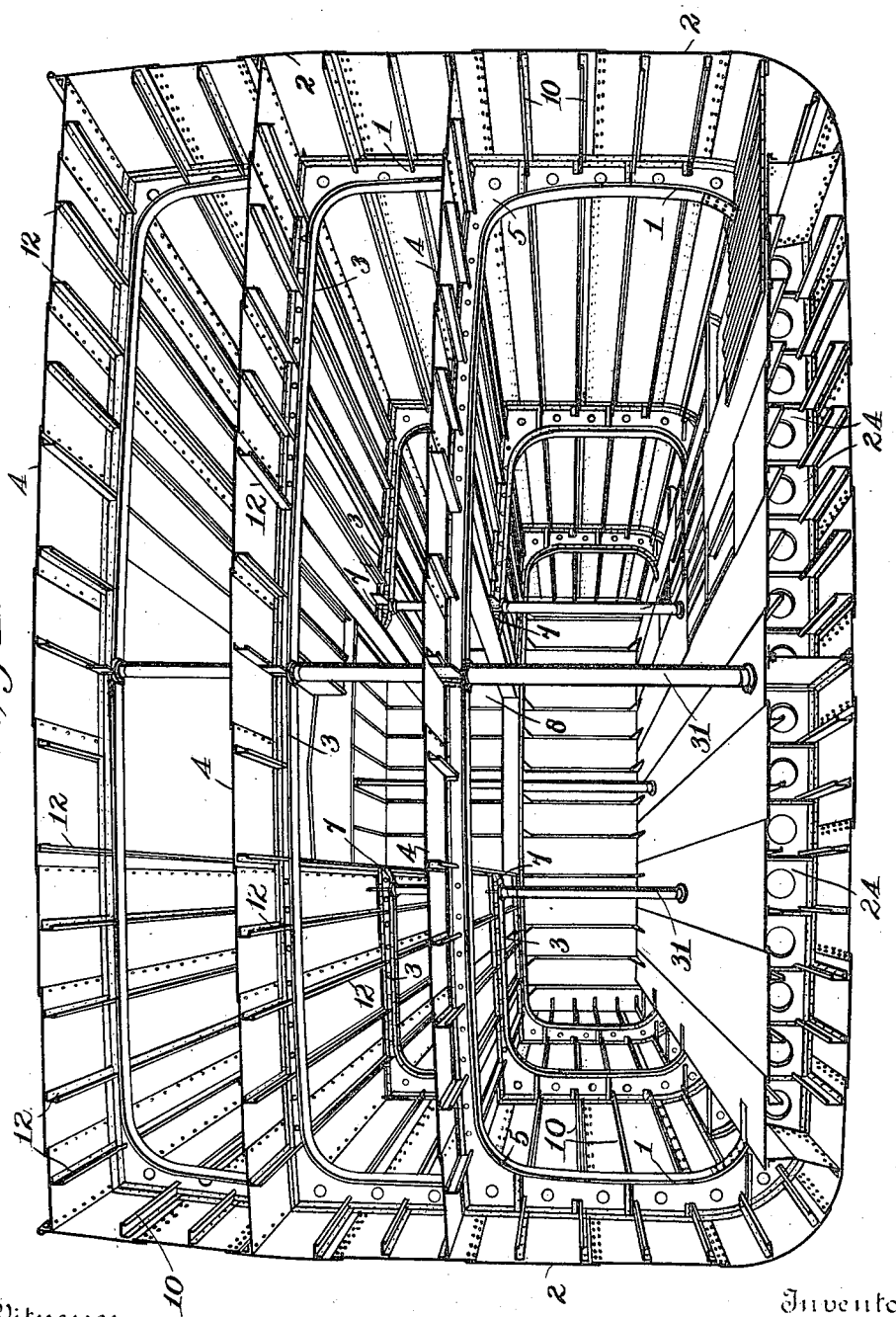

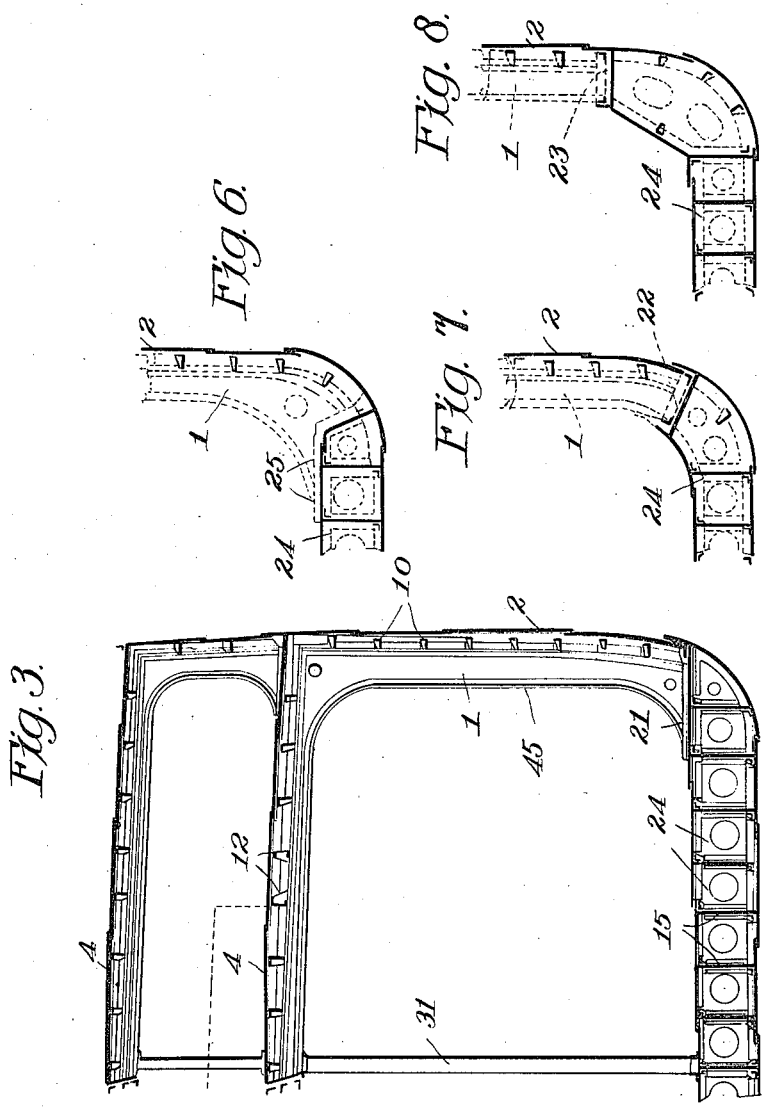

J. W. ISHERWOOD.
METHOD OF BUILDING LONGITUDINALLY FRAMED VESSELS.
APPLICATION FILED DEC. 1, 1911.
1,147,732.
Patented July 27, 1915.
5 SHEETS—SHEET 4.
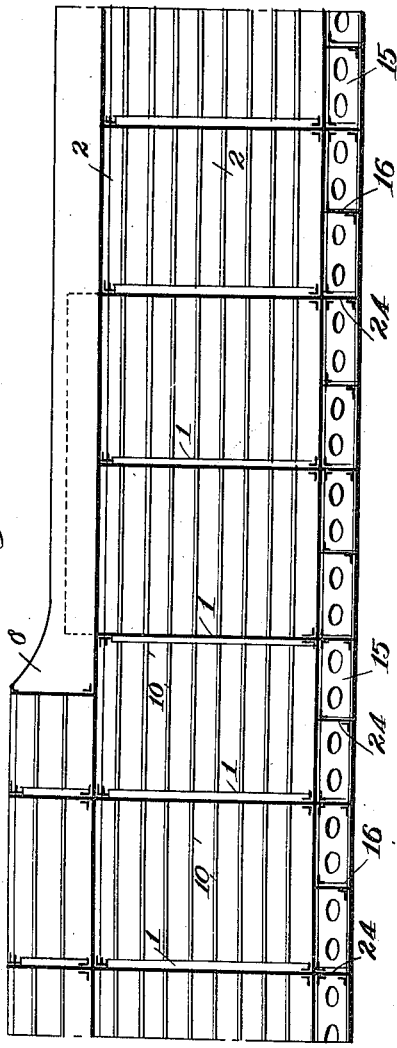
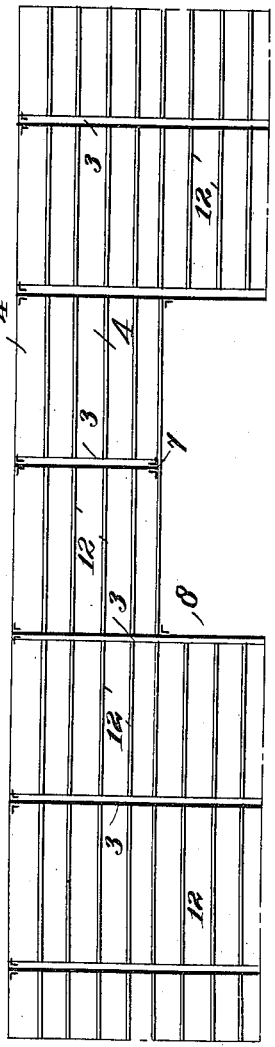
Witnesses
Inventor
J. W. Isherwood
Attorneys

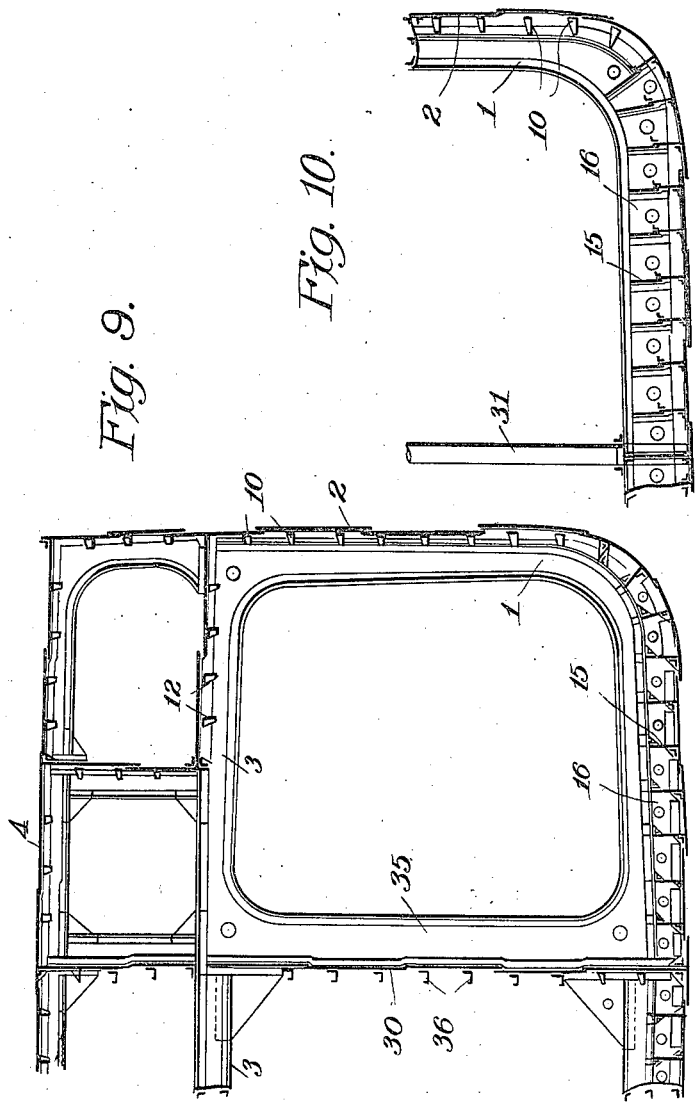

UNITED STATES PATENT OFFICE.

JOSEPH WILLIAM ISHERWOOD, OF MIDDLESBROUGH, ENGLAND.

METHOD OF BUILDING LONGITUDINALLY-FRAMED VESSELS.

1,147,732. Specification of Letters Patent. Patented July 27, 1915.

Original application filed January 28, 1907, Serial No. 354,521. Divided and this application filed December 1, 1911. Serial No. 663,330.

*To all whom it may concern:*

Be it known that I, JOSEPH W. ISHERWOOD, a subject of the King of Great Britain, residing at Middlesbrough, in the shire of York and country of England, have invented certain new and useful Improvements in Methods of Building Longitudinally-Framed Vessels; and I do hereby declare the following to be a full, clear, and exact description of the invention, such as will enable others skilled in the art to which it appertains to make and use the same.

This invention relates to a method of erecting longitudinally framed vessels of large sizes and of all types, and has for its object to produce a method which will be very much simpler, less costly, and far more expeditious than has been heretofore possible in the erection of large vessels, having continuous longitudinal frames all as will appear more fully hereinafter.

As is well known, in erecting large vessels employing continuous longitudinal frames according to the ordinary procedure, the longitudinals have to first be brought into position and held there by intercostal transverses or by other means. But in this procedure, since there is no ready apparatus for erecting the longitudinals and getting them into position, and since the intercostal transverses constitute a very poor means for holding said longitudinals in such position as will cause them to faithfully follow the contour of the ship, this method is very vexatious and expensive. It causes considerable delay in getting the parts in place, and the intercostals are further liable to get out of line, when they must be brought back into their proper positions. It is therefore a well recognized fact that the erection of a ship on the longitudinal principle is much more troublesome and much more expensive than the erection on the transverse system. These difficulties in reality have stood in the way of the general adoption of longitudinally framed vessels for fifty years. In fact, the *Great Eastern* offered very serious obstacles along this line owing to her great size at that time, and even now had a very large vessel been attempted on the longitudinal system prior to my invention, it would have entailed a very much greater cost than would have the erection of the same vessel on the transverse system. By my invention, however, I am enabled to erect a longitudinally built vessel simply, expeditiously and at comparatively a much less cost than has been heretofore possible for the same class of vessel, all as will appear below.

With the above and other objects in view, my invention consists in the novel steps constituting my new method of erecting longitudinally built vessels, all as will be more fully hereinafter disclosed, and particularly pointed out in the claims.

This application constitutes a division of my co-pending application #354,521, entitled Construction of floating vessels, and filed January 28, 1907.

Figure 2:
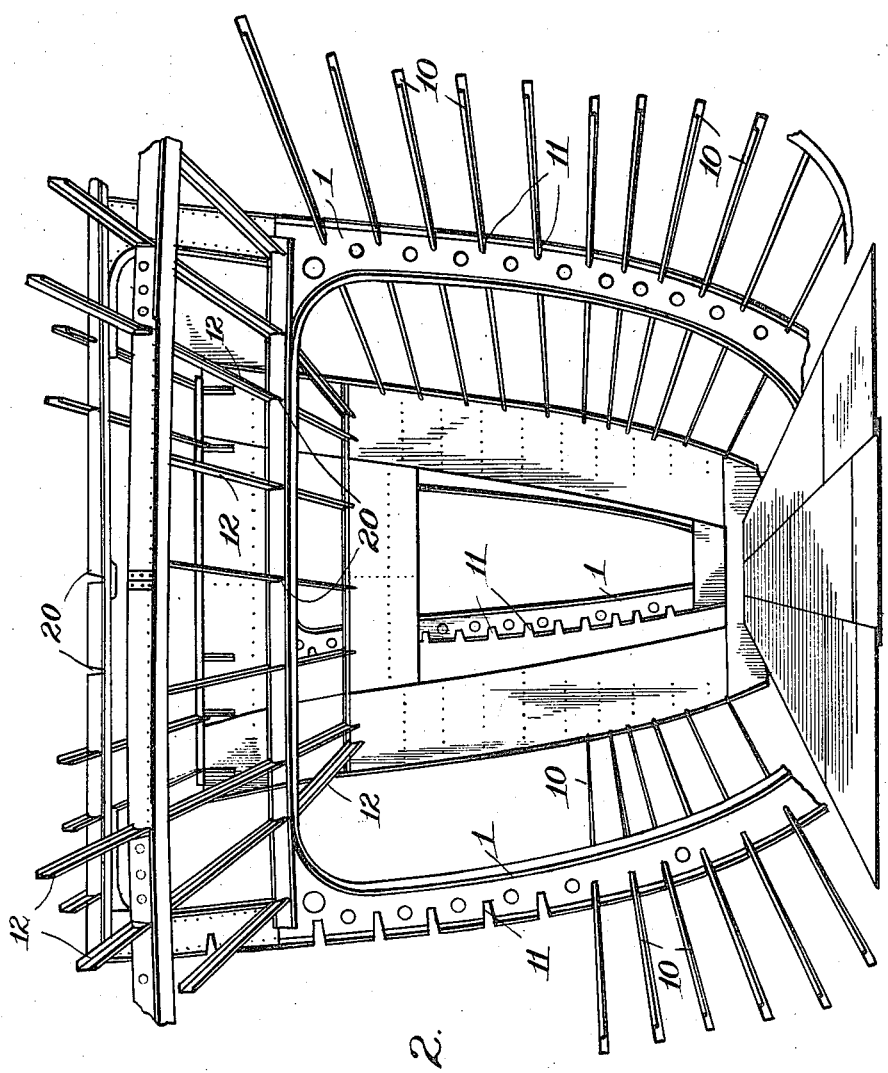

Referring to the accompanying drawings forming a part of this specification, in which like numerals designate like parts in all the views:—Figure 1 is a perspective transverse sectional view of a vessel built in accordance with my invention; Fig. 2 is a perspective view of a portion of the vessel showing certain of the parts illustrated in Fig. 1, before the shell plating is attached; Figs. 3, 4 and 5, are, respectively, a half sectional, a part profile, and a deck plan view of a single decked cargo steamer, fitted with a double bottom for water ballast; Figs. 6, 7 and 8 illustrate variations in the method of fitting the inner and bottom plating in vessels having double bottoms; Fig. 9 is a half section of a vessel designed for carrying petroleum or other liquid in bulk; and, Fig. 10 shows an alternative method to that shown in Fig. 9, of fitting the floors in vessels with single bottoms.

1 indicates abnormally deep and heavy transverse frames which are a plurality of times stronger and spaced a plurality of times farther apart than has been heretofore customary in the same type of vessel, and the outer surfaces of which form portions of the outer contour of the completed frame, all as will be clear from my co-pending application above. After these abnormally heavy transverse frames are brought to position, as best indicated in Fig. 2, and temporarily shored or otherwise secured in place, as by ribbands as is usually done in the construction of vessels, I next bring the suitably shaped longitudinal frames 10 to position, and secure them to the transverse frames 1 by any suitable means, but prefer to pass them through the notches 11 in said frames 1, being careful to cause the outer surfaces of the frames 10 to lie flush with the outer surfaces of the frames 1, and with what will later become the outer surface or contour of the framing of the ship. This procedure offers comparatively no difficulty at all, and it is very much less expensive than is the former procedure above alluded to for longitudinally framed vessels, as will be appreciated by those skilled in the art. In the deck portion of the vessel the transverse beams 3 rigid with the transverses 1 are preferably likewise provided with notches 20, and the longitudinal beams 12 are also preferably passed through said notches so that their outer surfaces will lie flush with the outer surfaces of said beams 3.

After the longitudinals are properly secured to the transverses in any suitable and well known manner, there results a completed framing which is ready for the shell plating. Some of the beams 3 are shown as being cut away as at 7, Fig. 1, in order to form the hatchways 8, while others of the beams are shown as continuous, all as will be readily understood. I prefer, however, to graduate the strength and weight of my longitudinal frames 10 from the bottom of the hull to the top, as disclosed in my co-pending application above. That is to say, as the top portions of the hull are approached, the strains to which said longitudinals are subjected get less, and therefore I correspondingly lessen the weight of said longitudinal frames, the heaviest being at the bottom.

After the framing has been completed, as above illustrated, the transverse frames 1 and longitudinals 10 are ready for the shell plating 2, which is secured to said members in any suitable and well known manner. The deck plating 4 is likewise suitably secured directly to the transverse beams 3 and longitudinal beams 12, so that the shell plating of the vessel becomes an intimate part of its bracing structure. It is preferred to make the beams 3 integral with the frames 1, as indicated at 5, but of course said beams may be otherwise suitably attached.

In order to enhance the value of the construction just described, the bottom framing, including the floors 15, Figs. 3, 4, 9 and 10, in vessels of either double or single bottom, may be fitted in a longitudinal direction, and is provided when and where thought desirable with transverse intercostals 16 at suitable intervals.

In vessels with double bottoms, such as are shown in Fig. 3, strong transverse frames 1 may be cut at or near the top of the tank bottom as indicated at 21 and 25 in said figures respectively, or they may be cut at the extreme edge or margin of the tank, as indicated at 22 and 23, in Figs. 7 and 8, respectively. In all cases the said strong transverse frames 1 are rigidly and efficiently attached to the tank bottoms, and in order to maintain the necessary continuity of transverse strength, floors or intercostals 24 are fitted in line with the strong transverse frames 1, as shown.

When preferred, of course, the longitudinal bottom framing or floors 15 may be fitted intercostally between transverse divisions or floors 24 that are in line with the strong transverse frames; or the said transverse frames may be made continuous around the bottom, when desired, and the tank margin cut where it stands in the way of said frames. Of course, suitable rigid fastenings between the cut and continuous parts will be provided in all cases, in order to maintain the continuity of strength of the said transverse frames.

A convenient construction for vessels having a single bottom is shown in Fig. 9, wherein the bottom framing is shown as provided with a continuous construction; but such framing may be fitted intercostally between the frames 1, as indicated in Fig. 10; or, if desired, the floors 15 may be of a reduced thickness and fitted the full depth of the strong transverse frames 1. The middle line bulkhead 30 shown in Fig. 9, of course, would not be required in vessels not adapted for carrying liquid cargoes.

Pillars 31, of any suitable section, may be fitted to the frames 1, and they require no intermediate pillars or girders at their heads, but when the said frames 1 are of a sufficient strength, these pillars may be dispensed with, leaving a clear hold.

It is obvious that when transverse bulkheads directly attached to the plating and deck are provided such as are fitted in all steamers for the purpose of subdivision, they may take the place of one or more of the strong transverse frames and strong transverse beams, and this is especially important in vessels designed for carrying petroleum or other liquid in bulk, where, from the nature of the cargo, to be carried, several such divisions must be fitted; but it will be evident, that it is not necessary for a structural strength with my system of framing, for transverse bulkheads to be fitted. Similar remarks apply to partial bulkheads. When such are fitted, they may be arranged, where practical to take the place partly or wholly of a strong transverse frame.

It will be observed that the middle line bulkhead 30 is shown as being supported by deep vertical plate stiffeners 35 in continuation of, and connected to, the strong transverse frames and the strong transverse beams. The intermediate support is obtained by fore and aft stiffeners 36, having the same spacing as the side frames 10.

It is recommended that the transverse bulkheads forming oil compartments be stiffened with horizontal stiffeners, in conjunction with vertical web plates, and the spacing of these horizontal stiffeners should coincide with that of the longitudinal frames 10 and middle line bulkhead stiffeners 36, in order that the bulkhead stiffeners can be directly bracketed to the longitudinal frames 10, and to the middle line bulkhead stiffeners 36.

As an example of the application of my system to a vessel of stated dimensions, it is said:—For a single decked cargo steamer 329.17 ft. x 44.74 ft. x 25.42 ft., Lloyd's dimensions, and estimated to carry 5,000 tons dead weight, the inner bottom could be fitted as shown in Fig. 3, or as shown in Figs. 6, 7, or 8. In a vessel of this character, I fit the strong frames 1 and the strong beams 3, 16 ft. apart. I make said frames 30 inches in depth, measured from the shell plating at the side, and of a thickness of nine-twentieths of an inch. I also provide double shell attachment angles 5″x5″ double riveted to the frames 1, and shell plating. The face angle will be $6\frac{1}{2} \times 4\frac{1}{2} \times \frac{15}{20}$ as will be readily understood by those skilled in the art. The strong transverse beams are constructed in a similar manner, but are twenty inches in depth and are fitted with single, double riveted deck attachment angles. The strong transverse frames and strong transverse beams in the bridge between decks are fitted immediately above those in the holds but are of reduced dimensions. In this manner the between decks and shade decks of vessels of any kind can be constructed.

By this new method of building a vessel, it will thus be seen, all transverse frames and beams may be dispensed with, other than the before mentioned widely spaced strong transverse frames and strong transverse beams.

From the foregoing, it will be readily understood by those skilled in the art, that the extraordinary difficulties and expenses heretofore attending the erection of vessels upon the continuous or intercostal longitudinal system, have been practicaly eliminated by my new method of erecting such vessels. In other words, it will now be clear that all kinds of longitudinally built vessel can be erected as expeditiously and as economically by my system, as one built on the transverse system, which is a result that has never been possible in ship building prior to my invention.

What I claim is:—

1. The method of erecting vessels on the longitudinal system, which consists in first bringing a plurality of the vessel's main frame transverse members to such positions that their outer surfaces will form parts of the outer contour of the vessel's completed framing; then securing to said members a plurality of the vessel's main frame longitudinal members in such positions that their outer surfaces will also form parts of the outer contour of the vessel's framing; and then securing the shell plating of the vessel directly to said transverse and longitudinal members, substantially as described.

2. The method of erecting vessels on the longitudinal system, which consists in first bringing substantially all of the vessel's main frame transverse members to such positions that their outer surfaces will form parts of the outer contour of the vessel's completed framing; then passing through and securing to said members substantially all of the vessel's main frame longitudinal members in such positions that their outer surfaces will also form parts of the outer contour of the vessel's framing; and then securing the shell plating of the vessel directly to said transverse and longitudinal members, substantially as described.

3. The method of erecting vessels on the longitudinal system, which consists in first bringing a plurality of the vessel's transverse frames and beams to such positions that their outer surfaces will form parts of the outer surface of the vessel's completed framing; then securing to said frames and beams respectively a plurality of longitudinal frames and beams and securing the same in such respective positions that their outer surfaces will likewise form parts of the outer contour of the vessel's completed framing; and then securing the side and deck plating respectively directly to said frames and beams, substantially as described.

4. The herein described method of erecting ships on the longitudinal system, which consists in assembling all of the transverse, main-frame members with their outer surfaces forming portions of the outer contour of the completed main frame, rigidly supporting all of the longitudinal, main-frame members on said assembled transverse members with the outer surfaces of said longitudinal members forming portions of the contour of the completed main frame, and rigidly inter-bracing such transverse and longitudinal members by the shell plating of the ship to hold said outer surfaces in place, substantially as described.

5. The herein described method of erecting ships on the longitudinal system, which consists in assembling continuous, transverse, main-frame members with their outer surfaces forming portions of the outer contour of the completed main frame, rigidly mounting on such assembled transverse members continuous, longitudinal, main-frame members of less width than such transverse members, with the outer surfaces of such longitudinal members forming portions of the outer contour of the completed main frame, and rigidly inter-bracing such transverse and longitudinal members by the shell plating of the ship to hold said outer surfaces in place, substantially as described.

6. The herein described method of erecting large ships on the longitudinal system, which consists in assembling continuous, transverse, main-frame members with their outer surfaces forming portions of the outer contour of the completed main frame; rigidly mounting on such assembled transverse members continuous, longitudinal, main-frame members graduated in weight from the bottom of the hull toward the top, said longitudinal members being of less width than such transverse members, with the outer surfaces of such longitudinal members forming portions of the outer contour of the completed main frame; and rigidly inter-connecting such transverse and longitudinal members by the shell plating of the ship to hold said outer surfaces in place, substantially as described.

In testimony whereof, I affix my signature, in presence of two witnesses.

JOSEPH WILLIAM ISHERWOOD.

Witnesses:
GEO. B. DRAKE,
MARTIN G. KINDLUND.